(12) United States Patent
Niglas et al.

(10) Patent No.: US 10,543,820 B2
(45) Date of Patent: Jan. 28, 2020

(54) SYSTEM AND METHOD FOR BRAKING A VEHICLE

(71) Applicant: Bendix Commercial Vehicle Systems LLC, Elyria, OH (US)

(72) Inventors: Paul C Niglas, Avon, OH (US);
Michael D Tober, Avon, OH (US);
David W Howell, Oak Ridge, NC (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 72 days.

(21) Appl. No.: 15/459,653

(22) Filed: Mar. 15, 2017

(65) Prior Publication Data
US 2018/0265063 A1     Sep. 20, 2018

(51) Int. Cl.

| | |
|---|---|
| *B60T 8/94* | (2006.01) |
| *B60T 7/20* | (2006.01) |
| *B60T 13/24* | (2006.01) |
| *B60T 13/68* | (2006.01) |
| *B60T 8/17* | (2006.01) |
| *B60T 8/32* | (2006.01) |
| *B60T 8/34* | (2006.01) |
| *B60T 17/22* | (2006.01) |

(52) U.S. Cl.
CPC .............. *B60T 8/94* (2013.01); *B60T 7/20* (2013.01); *B60T 8/1708* (2013.01); *B60T 8/323* (2013.01); *B60T 8/343* (2013.01); *B60T 13/24* (2013.01); *B60T 13/683* (2013.01); *B60T 17/221* (2013.01); *B60T 2270/402* (2013.01)

(58) Field of Classification Search
CPC ... B60T 8/94; B60T 7/20; B60T 13/24; B60T 13/683
See application file for complete search history.

(56) References Cited

U.S. PATENT DOCUMENTS

| | | | |
|---|---|---|---|
| 3,756,661 A | | 9/1973 | Michellone |
| 4,049,324 A | * | 9/1977 | Cermak ................ B60T 13/683 |
| | | | 188/3 R |

(Continued)

FOREIGN PATENT DOCUMENTS

| | | |
|---|---|---|
| EP | 1241065 B1 | 1/2004 |
| EP | 1561661 B1 | 8/2005 |
| WO | 0071400 A1 | 11/2000 |

OTHER PUBLICATIONS

Emig, R. et al: "Antilock Braking Systems (ABS) for Commercial Vehicles—Status 1990 and Future Prospects", Vehicle Electronics in the 90's; Dearborn, Oct. 15-17, 1990; [Proceedings of the International Congress on Transportation Electronics], New York, IEEE, US, Oct. 1, 1990 (Oct. 1, 1990), pp. 515-523, XP000223572, ISBN: 978-1-56091-047-3.

(Continued)

*Primary Examiner* — Vishal R Sahni
(74) *Attorney, Agent, or Firm* — Brian E. Kondas

(57) ABSTRACT

A vehicle braking system for a vehicle combination includes a first brake axle including a first actuatable brake, a second brake axle including a second actuatable brake, a third brake axle including a third actuatable brake, a first valve controlling actuation of the first actuatable brake and actuation of the second actuatable brake, and a second valve controlling actuation of the second actuatable brake and actuation of the third actuatable brake.

19 Claims, 2 Drawing Sheets

(56) References Cited

U.S. PATENT DOCUMENTS

| | | | |
|---|---|---|---|
| 4,455,051 A * | 6/1984 | Falk | B60T 17/18 188/349 |
| 4,572,319 A | 2/1986 | Fontaine | |
| 4,793,661 A * | 12/1988 | Munro | B60T 13/263 180/287 |
| 5,046,786 A * | 9/1991 | Johnston | B60T 8/263 188/151 A |
| 5,273,347 A * | 12/1993 | Hansson | B60T 7/20 303/24.1 |
| 5,302,008 A | 4/1994 | Miyake et al. | |
| 5,340,212 A * | 8/1994 | Latvala | B60T 8/263 188/349 |
| 5,456,526 A | 10/1995 | Iwasa et al. | |
| 5,458,402 A | 10/1995 | Jeffery | |
| 6,109,702 A | 8/2000 | Horn et al. | |
| 6,164,730 A * | 12/2000 | Main | B60R 25/08 303/15 |
| 6,582,030 B2 | 6/2003 | Harris | |
| 6,598,943 B2 | 7/2003 | Harris | |
| 6,672,683 B1 | 1/2004 | Stumpe et al. | |
| 7,096,108 B2 | 8/2006 | Nilsson et al. | |
| 2003/0111894 A1 * | 6/2003 | Wattenburg | B60R 25/00 303/7 |
| 2005/0218719 A1 * | 10/2005 | Hatipoglu | B60T 8/175 303/188 |

OTHER PUBLICATIONS

Notification of Transmittal of the International Search Report and the Written Opinion of the International Searching Authority for counterpart International Application PCT/US2018/022369, 1 page, dated May 23, 2018.

International Search Report of the International Searching Authority for counterpart International Application PCT/US2018/022369, 5 pages, dated May 23, 2018.

Written Opinion of the International Searching Authority for counterpart International Application PCT/US2018/022369, 7 pages, dated May 23, 2018.

Information on Search Strategy from the International Searching Authority for counterpart International Application PCT/US2018/022369, 1 page, dated May 23, 2018.

* cited by examiner

SYSTEM AND METHOD FOR BRAKING A VEHICLE

BACKGROUND

The present invention relates to vehicle braking. It finds particular application in conjunction with braking a vehicle during a failure and will be described with particular reference thereto. It will be appreciated, however, that the invention is also amenable to other applications.

Drivers of modern air braked vehicles increasingly rely on advanced driver assistance systems for braking. When there is any type of failure in the braking system, there is currently only a limited amount of actions that can be taken by a brake controller to maintain braking by the driver assistance system.

The present invention provides a new and improved apparatus and method for braking a vehicle during a failure of a driver assistance system.

SUMMARY

In one aspect of the present invention, it is contemplated that a vehicle braking system for a vehicle combination includes a first brake axle including a first actuatable brake, a second brake axle including a second actuatable brake, a third brake axle including a third actuatable brake, a first valve controlling actuation of the first actuatable brake and actuation of the second actuatable brake, and a second valve controlling actuation of the second actuatable brake and actuation of the third actuatable brake.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
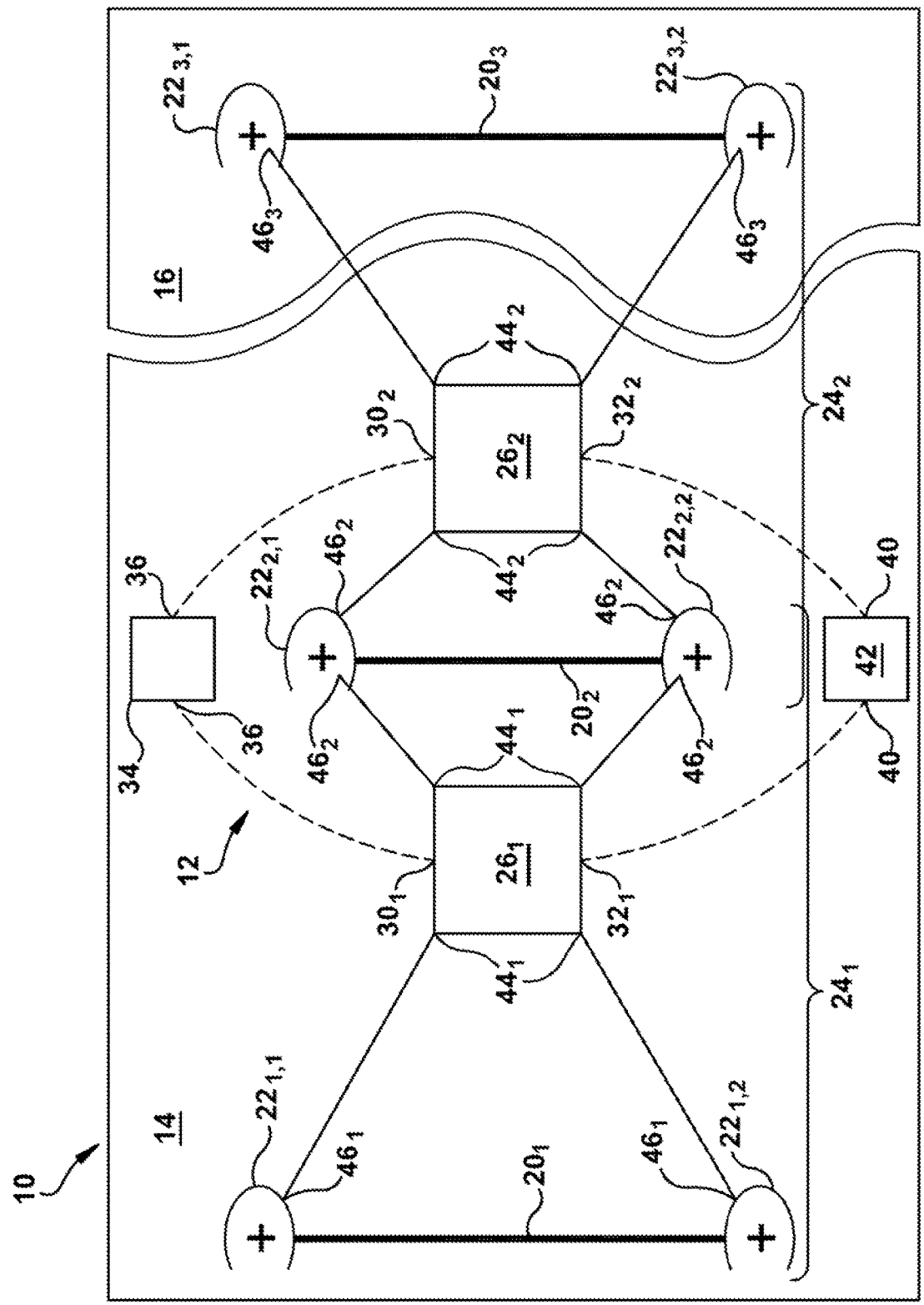
FIG. 1 illustrates a schematic representation of a vehicle braking system in accordance with one embodiment of an apparatus illustrating principles of the present invention.

With reference to FIG. 1, a simplified component diagram of a combination vehicle 10 including an exemplary braking system 12 is illustrated in accordance with one embodiment of the present invention. In the illustrated embodiment, the combination vehicle 10 is an articulated vehicle including a first portion 14 (e.g., a tractor portion) and a second portion 16 (e.g., a trailer portion).

The combination vehicle 10 includes a plurality of axles 20 (e.g., brake axles). For example, three (3) axles $20_{1,2,3}$ (collectively 20) are shown in the illustrated embodiment. The first and second axles $20_{1,2}$ are included on the tractor portion 14 of the vehicle 10, and the axle $20_3$ is included on the trailer portion 16 of the vehicle 10. In one embodiment, the first axle $20_1$ is a steer axle on the tractor portion 14; the second axle $20_1$ is a drive axle on the tractor portion 14; and the third axle $20_3$ is a trailer axle on the trailer portion 16. It is to be understood that any number of axles in any configuration distributed between the tractor portion 14 and the trailer portion 16 of the vehicle 10 are contemplated.

Each of the axles 20 includes at least one respective actuatable brake 22. For example, the first axle $20_1$ includes first actuatable brakes $22_1$ (e.g., actuatable brakes $22_{1,1}$ and $22_{1,2}$); the second axle $20_2$ includes second actuatable brakes $22_2$ (e.g., actuatable brakes $22_{2,1}$ and $22_{2,2}$); and the third axle $20_3$ includes third actuatable brakes $22_3$ (e.g., actuatable brakes $22_{3,1}$ and $22_{3,2}$). The brakes $22_{1,1}$; $22_{1,2}$; $22_{2,1}$, $22_{2,2}$; and $22_{3,1}$, $22_{3,2}$ are collectively referenced as 22.

The first axle $20_1$ and the first actuatable brake $22_1$ are included in a first brake group $24_1$. The second axle $20_2$ and the second actuatable brake $22_2$ are included in both the first brake group $24_1$ and a second brake group $24_2$. The third axle $20_3$ and the third actuatable brake $22_3$ are included in the second brake group $24_2$.

A first valve $26_1$ controls actuation of the first and second actuatable brakes $22_{1,2}$ (e.g., the first brake group $24_1$), and a second valve $26_2$ controls actuation of the second and third actuatable brakes $22_{2,3}$ (e.g., the first brake group $24_1$). In one embodiment, the first and second valves $26_{1,2}$ (collectively 26) are both in the tractor portion 14 of the vehicle 10. However, other embodiments in which at least one of the valves 26 is on the trailer portion 16 of the vehicle 10 are contemplated. In any embodiment, it is contemplated that the first valves $26_{1,2}$ are solenoid valves.

It is also contemplated the first and second valves 26 are control valves that receive both a pneumatic control signal at respective pneumatic control signal ports $30_{1,2}$ (collectively 30) and respective electronic control signal ports $32_{1,2}$ (collectively 32).

A foot brake valve 34 (e.g., pedal) is depressed by an operator of the vehicle 10 to cause at least one of the brakes 22 to be actuated (e.g., to brake the vehicle 10) during a manual braking event. A pressure of a pneumatic fluid delivered from a foot brake delivery port 36 of the foot brake valve 34 is fluidly communicated (e.g., transmitted) to the respective pneumatic control signal ports $30_{1,2}$ of the first and second valves 26 as respective pneumatic control signals. The pneumatic control signals fluidly delivered to the respective pneumatic control signal ports $30_{1,2}$ are based on how much the operator depresses the foot brake valve 34. Braking of the vehicle 10 achieved in response to the foot brake valve 34 being depressed by the operator is referred to as a manual braking event. Therefore, in this embodiment, the first and second valves 26 receive pneumatic control signals during the manual braking event and the respective pneumatic control signals are manually controlled by application of the foot brake valve 34 by the operator.

An electrical delivery port 40 of an electronic control unit 42 (ECU) electrically communicates with the respective electronic control signal ports $32_{1,2}$ of the first and second valves 26. During an automatic braking event (e.g., an adaptive cruise control (ACC) braking event, an antilock brake system (ABS) braking event, etc.), the ECU 42 electrically communicates (e.g., transmits) electronic signals from the electrical ECU delivery port 40 to the respective electronic control signal ports $32_{1,2}$ of the first and second valves 26 as respective electronic control signals to cause at least one of the brakes 22 to be actuated (e.g., to brake the vehicle 10). Since the electronic control signals are communicated during an automatic braking event, these signals are referred to as automatically controlled braking signals. In one embodiment, it is contemplated the ECU 42 is an anti-lock braking system (ABS) controller that transmits the electronic control signals to the first and second valves 26 during an ABS event (i.e., an automatic braking event).

During normal operation, at least one of the foot brake valve 34 and the ECU 42 transmits the pneumatic control signals and/or the electronic control signals to the respective control ports 30, 32 of both the first and second valves $26_{1,2}$. The first valve $26_1$ transmits a pneumatic fluid from a first valve supply port (not shown) to a first valve delivery port $44_1$ based on the control signals received at the pneumatic and electronic control ports $30_1$, $32_1$, respectively. Similarly, the second valve $26_2$ transmits the pneumatic fluid from a second valve supply port (not shown) to a second valve delivery port $44_2$ based on the control signals received at the pneumatic and electronic control ports $30_2$, $32_2$, respectively. The control signals received at the pneumatic and electronic control ports $30_1$, $32_1$, respectively, control operation of the first valve $26_1$ independently of each other. Similarly, the control signals received at the pneumatic and electronic control ports $30_2$, $32_2$, respectively, control operation of the second valve $26_2$ independently of each other.

For example, if neither the pneumatic control signal nor the electronic control signal is received at the respective control ports $30_1$, $32_1$, the first valve $26_1$ does not transmit the pneumatic fluid from the first valve supply port (not shown) to the first valve delivery port $44_1$. Otherwise, if at least one of the pneumatic control signal and the electronic control signal is received at the respective control ports $30_1$, $32_1$, the first valve $26_1$ does transmit the pneumatic fluid from the first valve supply port (not shown) to the first valve delivery port $44_1$. It is contemplated that the amount of pneumatic fluid (e.g., the pressure of the pneumatic fluid) transmitted from the first valve supply port (not shown) to the first valve delivery port $44_1$ is based on (e.g., proportional or linearly proportional to) the pressure of the pneumatic fluid at the pneumatic control port $30_1$. On the other hand, while the amount of pneumatic fluid (e.g., the pressure of the pneumatic fluid) transmitted from the first valve supply port (not shown) to the first valve delivery port $44_1$ is based on the electronic control signal being present at the control port 32, it is not contemplated to be a proportional relationship.

The second valve $26_2$ operates in a similar manner to the first valve $26_2$ with regard to transmitting the pneumatic fluid from the second valve supply port (not shown) to the second valve delivery port $44_2$ based on the pneumatic and electronic control signals at the control ports $30_2$, $32_2$, respectively.

Each of the actuatable brakes $22_{1,2,3}$ includes a respective control port $46_{1,2,3}$ (e.g., a pneumatic control port). The control port $46_1$ fluidly communicates with the first valve delivery port $44_1$; the control port $46_2$ fluidly communicates with both the first valve delivery port $44_1$ and the second valve delivery port $44_2$; and the control port $46_3$ fluidly communicates with the second valve delivery port $44_2$.

The brakes $22_{1,2,3}$ actuate based on the pressure of the pneumatic fluid present at the respective control ports $46_{1,2,3}$. More specifically, the first and second actuatable brakes $22_{1,2}$ actuate based on the pneumatic pressure at the delivery port $44_1$ of the first valve $26_1$; and the second and third actuatable brakes $22_{2,3}$ actuate based on the pneumatic pressure at the delivery port $44_2$ of the second valve $26_2$. Since the second control port $46_2$ fluidly communicates with both the delivery port $44_1$ of the first valve $26_1$ and the delivery port $44_1$ of the second valve $26_2$, the second actuatable brakes $22_2$ actuate based on either the pneumatic pressure at the delivery port $44_1$ of the first valve $26_1$ or the pneumatic pressure at the delivery port $44_2$ of the second valve $26_2$. For example, the second actuatable brakes $22_2$ actuate based on the higher of the pneumatic pressures at the delivery ports $44_{1,2}$. In another embodiment, another valve (e.g., a double-check valve) (not shown) arbitrates between the pneumatic pressure at the delivery port $44_1$ and the pneumatic pressure at the delivery port $44_2$ for actuating the second actuatable brakes $22_2$.

In the event of a malfunction (e.g., failure), insufficient pneumatic pressure may be available at the first valve delivery port $44_1$ to actuate the first and second brakes $22_{1,2}$ when desired. For example, a leak may reduce the supply pressure of the pneumatic fluid available to pass from the first valve supply port (not shown) to the first valve delivery port $44_1$. Alternatively, the first valve $26_1$ may simply fail to change states and pass the pneumatic fluid from the first valve supply port (not shown) to the first valve delivery port $44_1$ even when at least one of the appropriate control signals requesting the fluid communication between the first valve supply port (not shown) and the first valve delivery port $44_1$ is present at the control ports $30_1$, $32_1$.

A malfunction may also cause insufficient pneumatic pressure to be available at the second valve delivery port $44_2$ to actuate the second and third brakes $22_{2,3}$ when desired. For example, a leak may reduce the supply pressure of the pneumatic fluid available to pass from the second valve supply port (not shown) to the second valve delivery port $44_2$. Alternatively, the second valve $26_2$ may simply fail to change states and pass the pneumatic fluid from the second valve supply port (not shown) to the second valve delivery port $44_2$ even when at least one of the appropriate control signals requesting the fluid communication between the second valve supply port (not shown) and the second valve delivery port $44_2$ is present at the control ports $30_2$, $32_2$.

Because the second actuatable brakes $22_2$ actuate based on either the pneumatic pressure at the delivery port $44_1$ or the pneumatic pressure at the delivery port $44_2$, the second actuatable brakes $22_2$ actuate when either the first valve $26_1$ or the second valve $26_2$ transmit the pneumatic fluid from the respective valve supply port (not shown) to the respective valve delivery port $44_{1,2}$. Therefore, although a malfunction causing insufficient pneumatic pressure to be available at one of the first valve delivery port $44_1$ and the second valve delivery port $44_2$ may cause one of the first brakes $22_1$ and the third brakes $22_3$ to be actuated, it is contemplated that sufficient pneumatic pressure will still be available at the other of the first valve delivery port $44_1$ and the second valve delivery port $44_2$ to actuate the other of the first brakes $22_1$ and the third brakes $22_3$.

Since the second brakes $22_2$ are actuated even when a malfunction causes either the first valve $26_1$ or the second valve $26_2$ to not transmit the pneumatic fluid from the respective valve supply port (not shown) to the respective valve delivery port $44_{1,2}$, two (2) of the three (3) brakes $22_{1,2,3}$ are actuated during such a malfunction. For example, if a malfunction causes the first valve $26_1$ to not transmit sufficient pneumatic fluid from the valve supply port (not shown) to the valve delivery port $44_1$ to actuate the first and second brakes $22_{1,2}$, it is contemplated that the second valve $26_2$ still transmits sufficient pneumatic fluid from the valve supply port (not shown) to the valve delivery port $44_2$ to actuate the second and third brakes $22_{2,3}$. Similarly, if a malfunction causes the second valve $26_2$ to not transmit sufficient pneumatic fluid from the valve supply port (not shown) to the valve delivery port $44_2$ to actuate the second and third brakes $22_{2,3}$, it is contemplated that the first valve $26_1$ still transmits sufficient pneumatic fluid from the valve supply port (not shown) to the valve delivery port $44_1$ to actuate the first and second brakes $22_{1,2}$.

The first valve 26₁, the second valve 26₂, the brake pedal 34, and the ECU 42 act as a means for independently controlling the first group 24₁ of the actuatable brakes 22₁,₂ and the second group 24₂ of the actuatable brakes 22₂,₃, where one of the actuatable brakes 22₂ is included in both the first and second groups 24₁,₂ of the actuatable brakes 22, and where one of the first and second groups 24₁,₂ of the actuatable brakes 22₁,₃ is continued to be controlled if the other of the first and second groups 24₁,₂ of the actuatable brakes 22₁,₃ fails to be controlled.

Figure 2:
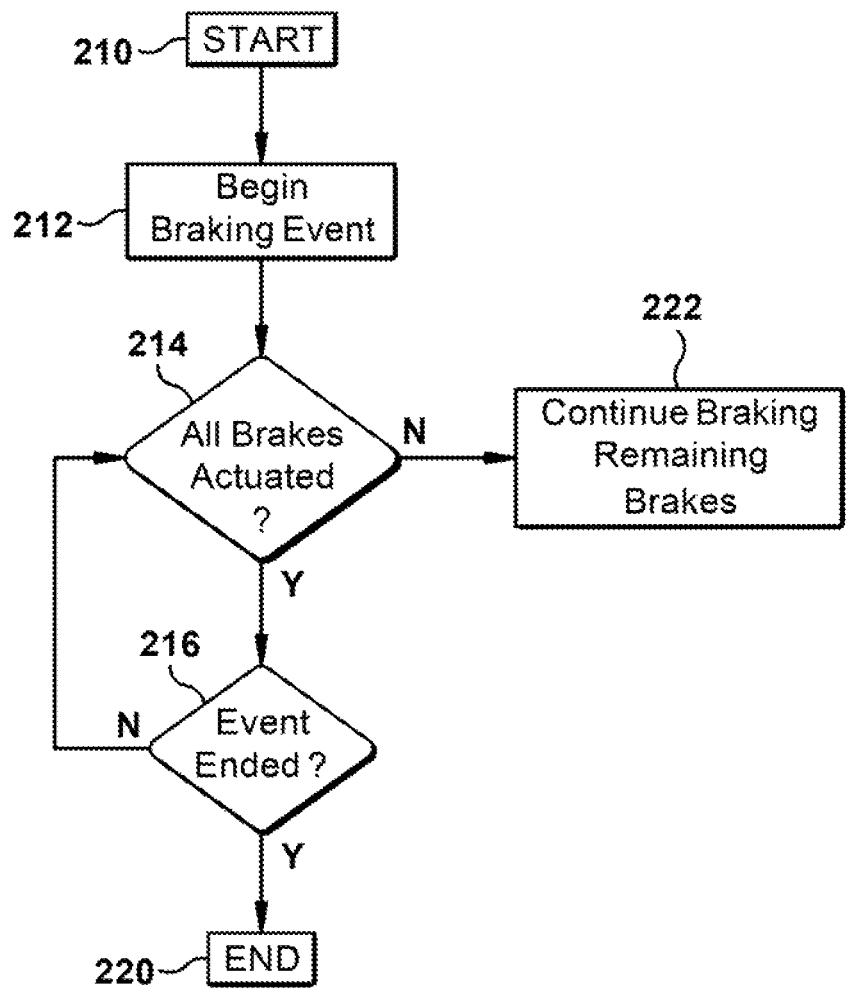
FIG. 2 is an exemplary methodology of braking the vehicle in accordance with one embodiment illustrating principles of the present invention.

With reference to FIG. 2, an exemplary methodology of the system shown in FIG. 1 for braking a vehicle combination is illustrated. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 2, the method starts in at step 210. Then, in a step 212, a vehicle braking event begins. For example, the braking event begins when at least one of i) the operator of the vehicle 10 depresses the pedal 34 to transmit pneumatic control signals to the pneumatic control ports 30 of the respective valves 26 to initiate a manual braking event and ii) the ECU 42 transmits electronic control signals to the electronic control ports 32 of the respective valves 26 to initiate an automatic braking event.

In a step 214, the ECU 42 monitors the brakes 22 to determine if the brakes 22 are actuated as demanded by the at least one of the manual braking event and the automatic braking event. If it is determined in the step 214 that the brakes 22 are actuated as demanded (e.g., no failure has occurred to either the valves 26 or the brakes 22), control passes to a step 216 to determine if the at least one braking event has ended. If it is determined in the step 216 that the at least one braking event has ended, control passes to a step 220 to end the method. Otherwise, if it is determined in the step 216 that the at least one braking event has not ended, control returns to the step 214.

If it is determined in the step 214 that the brakes 22 in one of the brake groups 24₁,₂ are not actuated as demanded (e.g., a failure has occurred in either the valves 26 or the brakes 22), control passes to a step 222 to continue actuating the at least one of the other brake groups 24₁,₂. Control then passes to the step 216 to determine if the at least one braking event has ended.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A braking system for a vehicle combination, the system including:

a first brake axle including a first actuatable service brake;
a second brake axle including a second actuatable service brake;
a third brake axle including a third actuatable service brake;
a first valve controlling actuation of the first actuatable service brake and actuation of the second actuatable service brake; and
a second valve controlling actuation of the second actuatable service brake and actuation of the third actuatable service brake, the second valve controlling actuation of the second actuatable service brake and actuation of the third actuatable service brake independent of the first valve controlling actuation of the first actuatable service brake and actuation of the second actuatable service brake.

2. The braking system as set forth in claim 1, wherein:
the first brake axle is on a tractor portion of the vehicle combination;
the second brake axle is on the tractor portion of the vehicle combination; and
the third brake axle is on a trailer portion of the vehicle combination.

3. The braking system as set forth in claim 2, wherein:
the first brake axle is a steer axle on the tractor portion of the vehicle combination;
the second brake axle is a drive axle on the tractor portion of the vehicle combination; and
the third brake axle is a trailer axle on the trailer portion of the vehicle combination.

4. The braking system as set forth in claim 1, wherein:
if the first valve fails to actuate at least one of the first actuatable service brake and the second actuatable service brake, the second valve continues controlling actuation of the second actuatable service brake and actuation of the third actuatable service brake; and
if the second valve fails to actuate at least one of the second actuatable service brake and the third actuatable service brake, the first valve continues controlling actuation of the first actuatable service brake and actuation of the second actuatable service brake.

5. The braking system as set forth in claim 1, wherein:
the first valve controls the actuation of the first actuatable service brake and the actuation of the second actuatable service brake based on both a first valve pneumatic control signal and a first valve electronic control signal, the first valve pneumatic control signal being independent of the first valve electronic control signal; and
the second valve controls the actuation of the second actuatable service brake and the actuation of the third actuatable service brake based on a second valve pneumatic control signal and a second valve electronic control signal, the second valve pneumatic control signal being independent of the second valve electronic control signal.

6. The braking system as set forth in claim 5, wherein:
the first valve pneumatic control signal and the second valve pneumatic control signal are based on a manually controlled braking signal; and
the first valve electronic control signal and the second valve electronic control signal are based on an automatically controlled braking signal.

7. The braking system as set forth in claim 6, wherein:
the manually controlled braking signal is based on actuation of a foot brake pedal by an operator of the vehicle combination; and the automatically controlled braking signal is based on actuation of an automatic braking system on the vehicle combination.

8. The braking system as set forth in claim 1, wherein:
the first brake axle is included in a first brake group;
the second brake axle is included in both the first brake group and a second brake group; and
the third brake axle is included in the second brake group.

9. The braking system as set forth in claim 8, wherein:
the first valve controls actuation of the actuatable service brakes in the first brake group; and
the second valve controls actuation of the actuatable service brakes in the second brake group.

10. The braking system as set forth in claim 9, wherein:
if one of the first valve and the second valve fails to control actuation of the respective actuatable service brakes in the first brake group and the second brake group, the other of the first valve and the second valve continues to control actuation of the actuatable service brakes in the other of the first brake group and the second brake group.

11. A braking system for a vehicle combination, the system including:
a plurality of brake axles;
a first brake group including a first plurality of actuatable service brakes on different ones of the brake axles, the first plurality of actuatable service brakes being all on a tractor portion of the vehicle combination;
a second brake group including a second plurality of actuatable service brakes on different ones of the brake axles, one of the first actuatable service brakes being included as one of the second actuatable service brakes, the plurality of second actuatable service brakes include one of the second actuatable service brakes on the tractor portion of the vehicle combination and another of the second actuatable service brakes on a trailer portion of the vehicle combination;
a first valve controlling the first actuatable service brakes; and
a second valve controlling the second actuatable service brakes, the second valve controlling actuation of the second group of actuatable service brakes independent of the first valve controlling actuation of the first group of actuatable service brakes.

12. The braking system as set forth in claim 11, wherein:
if one of the first valve and the second valve fails to control the respective actuatable service brakes, the other of the first valve and the second valve continues to control the respective actuatable service brakes.

13. The braking system as set forth in claim 11, wherein:
if one of i) the first valve fails to control the plurality of the first actuatable service brakes and ii) the second valve fails to control the plurality of the second actuatable service brakes, the other of the first valve and the second valve continues to control the respective actuatable service brakes.

14. The braking system as set forth in claim 11, wherein:
one of the plurality of the first actuatable service brakes is on a first of the brake axles;
another of the plurality of the first actuatable service brakes is on a second of the brake axles;
one of the plurality of the second actuatable service brakes is on the second of the brake axles; and
another of the plurality of the second actuatable service brakes is on a third of the brake axles.

15. The braking system as set forth in claim 14, wherein:
the first brake axle is a steer axle on the tractor;
the second brake axle is a drive axle on the tractor; and
the third brake axle is a trailer axle on the trailer.

16. A method for braking a vehicle combination, the method including:
controlling a first group of actuatable service brakes on a first brake axle and a second brake axle, the first axle and the second axle being on a tractor portion of a vehicle combination;
controlling a second group of actuatable service brakes on the second brake axle and a third brake axle, the third brake axle being on a trailer portion of the vehicle combination; and
if one of the actuatable service brakes fails to be controlled, independently continuing to control the respective actuatable service brakes on two of the other brake axles.

17. The method for braking a vehicle combination as set forth in claim 16, further including:
actuating a first valve for controlling the first group of the actuatable service brakes; and
actuating a second valve for controlling the second group of the actuatable service brakes.

18. The method for braking a vehicle combination as set forth in claim 16, wherein the continuing step includes:
if actuating the first valve fails to control the first group of the actuatable service brakes, continuing to actuate the second valve for controlling the second group of the actuatable service brakes; and
if actuating the second valve fails to control the second group of the actuatable service brakes, continuing to actuate the first valve for controlling the first group of the actuatable service brakes.

19. The method for braking a vehicle combination as set forth in claim 16, wherein:
the step of controlling the first group includes controlling one of the actuatable service brakes in the first group on a steer axle of a first portion of the vehicle combination;
the step of controlling the first group includes controlling another of the actuatable service brakes in the first group on a drive axle of the first portion of the vehicle combination;
the step of controlling the second group includes controlling one of the actuatable service brakes in the second group on the steer axle of the first portion of the vehicle combination; and
the step of controlling the second group includes controlling another of the actuatable service brakes in the second group on a trailer axle of a second portion of the vehicle combination.

* * * * *